United States Patent [19]

Shimp et al.

[11] Patent Number: 4,634,981
[45] Date of Patent: Jan. 6, 1987

[54] METHOD FOR TESTING A CIRCUIT BREAKER USING A THREE TERMINAL CURRENT TRANSFORMER

[75] Inventors: Alan B. Shimp, Monroeville Boro; Derek A. Paice, Murrysville Boro, both of Pa.

[73] Assignee: Westinghouse Electric Corp., Pittsburgh, Pa.

[21] Appl. No.: 662,646

[22] Filed: Oct. 19, 1984

[51] Int. Cl.⁴ .................................... G01R 31/32
[52] U.S. Cl. ............................................. 324/424
[58] Field of Search ............... 324/424; 361/93, 94, 361/96, 115, 58; 336/145; 323/342

[56] References Cited

U.S. PATENT DOCUMENTS

| | | | |
|---|---|---|---|
| 2,657,354 | 10/1953 | Van Sickle | 324/424 |
| 3,424,958 | 1/1969 | Groat | 324/424 |
| 3,852,660 | 12/1974 | Maier | 324/424 |
| 3,924,160 | 12/1975 | Maier | 324/424 |
| 3,930,187 | 12/1975 | Misencik | 324/424 |
| 4,105,965 | 8/1975 | Russell | 324/424 |

OTHER PUBLICATIONS

Saturating Core Devices-Operating Principles and Applications by Leonard R. Crow, May 8, 1950, pp. 98–107.

Primary Examiner—Reinhard J. Eisenzopf
Assistant Examiner—Jack B. Harvey
Attorney, Agent, or Firm—M. J. Moran

[57] ABSTRACT

A method for and an apparatus for use in testing a circuit breaker, the circuit breaker having at least one current sensing means, such as a current transformer, trip circuitry, and circuit interruption means. In the method, a low voltage A.C. source is provided; and means for generating an A.C. signal is also provided, the means for generating an A.C. signal having the capability to vary the magnitude of the voltage of the A.C. signal. The low voltage A.C. source is connected with the means for generating an A.C. signal; and the means for generating an A.C. signal is connected with a current sensing means of the circuit breaker. The current sensing means is energized with an A.C. signal; and the magnitude of the current in the A.C. signal is monitored. The magnitude of the current in the A.C. signal and the state of the circuit interruption means in the circuit breaker is compared with a predetermined magnitude of A.C. at which the circuit interruption means in the circuit breaker in proper working condition would be placed in an open state to provide an indication of the condition of the circuit breaker. An apparatus is provided for use in testing a circuit breaker adapted for connection with a low voltage A.C. source and with a current sensing means, such as a current transformer, included in the circuit breaker. The apparatus includes means for varying the magnitude of the voltage of the low voltage A.C. source, and means for varying the magnitude adapted for connection with the low voltage A.C. source.

5 Claims, 7 Drawing Figures

METHOD FOR TESTING A CIRCUIT BREAKER USING A THREE TERMINAL CURRENT TRANSFORMER

BACKGROUND OF THE INVENTION

1. Field of the Invention

This invention relates to a method for and an apparatus for use in testing a circuit breaker and, more particularly to a method for and an apparatus for use in testing a circuit breaker which can provide an indication of the condition of the entire trip system in a circuit breaker, as well as provide an indication of the condition of an already installed circuit breaker.

2. Description of the Prior Art

Often, it is desirable and necessary to test circuit breakers that have been already installed. The purpose of testing the circuit breaker is to verify that the circuit breaker will actually trip at the proper current values and with the proper time delay. Having a circuit breaker trip at the appropriate current values and with the proper time delay can prevent or minimize damage to the device being protected by the breaker upon occurrence of an overcurrent condition.

A generally accepted method of testing circuit breakers is known as primary injection testing. In primary injection testing, a current from a low voltage source is passed directly through each breaker pole in a circuit breaker. Primary injection testing generally requires a power supply which can produce several times rated breaker current, which for various circuit breakers could amount to thousands of amperes. To conduct the test, the conductors which normally carry the load current must be removed from the circuit breaker and heavy test leads are connected in their place to energize the circuit breaker. The primary injection testing process normally requires a significant expenditure of effort and time. Also, a relatively high current from an alternating current source is generally required. A potential safety hazard is presented in this method of testing, since a risk may exist to personnel and equipment when the poles of a circuit breaker are connected to or disconnected from a potentially energized electrical conductor.

On circuit breakers having solid state trip units, a simpler method of testing over the primary injection testing method is known. In this method, a low power direct current source injects one of a number of preset values of direct current into the trip circuit of a circuit breaker to simulate an overcurrent condition. Depending on the preset value, the circuit breaker either trips instantaneously or after an appropriate time delay. Testing of the solid state trip circuit of a circuit breaker in this manner is advantageous in that it is not necessary to connect or disconnect energized conductors to the circuit breaker. Generally, testing of the trip circuit can be done with equipment of a relatively small volume and weight. An example, of a circuit breaker fault simulator used in testing the solid state trip circuitry of a circuit breaker is disclosed in U.S. Pat. No. 3,852,660 to Maier et al. and U.S. Pat. No. 3,924,160 to Maier et al. In these patents a relatively small, lightweight fault simulator is provided which has a selector switch thereon. The simulator is connected to terminals on the outer casing on the circuit breaker which connects the fault simulator to the trip circuit in series with the fault sensors normally associated with the trip circuit of the circuit breaker. A relatively high level simulated fault signal or a relatively low level simulated fault signal may be provided to the trip circuit by adjusting the selector switch. A disadvantage of testing only the trip circuitry of a circuit breaker in the above described manner is that the current transformers in the circuit breaker are not tested nor are the input bridge rectifiers or similar rectification devices in the solid state circuitry.

U.S. Pat. No. 4,105,965 to Russell discloses a static trip circuit breaker test set. In Russell, there is provided an improved field test set for static trip circuit breakers which is adapted to inject low current, fault simulating signals directly into the breaker static trip unit. Russell further discloses a current transformer continuity check circuit which is included in the test set. Additionally, the Russell patent also discloses a known type of field test set for testing a static trip circuit breaker whereby low current, fault simulating signals are injected into the secondary circuits of the breaker phase current monitoring transformers which are connected as inputs to the static trip unit.

U.S. Pat. No. 3,424,958 to Groat discloses an apparatus and method for simulating electrical fault conditions in a protective relay system. In Groat's method, a voltage and a current are fed to a relay to be tested. The phase angle between the voltage and the current is controlled and the magnitude of the voltage and current is caused to change from a first and a second value and the sequence of change is controlled.

U.S. Pat. No. 3,930,187 to Misencik discloses a ground fault interrupter of the differential transformer type having a means for protection against a grounded neutral condition. A test circuit branch is connected between a first point on the load side of the differential transformer to the hot line conductor and on the supply side of the differential transformer to the neutral conductor. The test circuit branch provides the capability to test the performance of the differential transformer.

What is needed, therefore, is a method for and an apparatus for use in testing a circuit breaker which requires a relatively low power alternating current source and offers a way of testing the entire circuit breaker to determine if a defective condition exists therein. What is further needed is an apparatus for use in testing the entire circuit breaker which is of a relatively small volume and weight and draws only a small current from a low voltage alternating current source.

SUMMARY OF THE INVENTION

In accordance with the present invention, there is provided a method for testing and an apparatus for use in testing a circuit breaker, the circuit breaker including at least one current transformer means for monitoring current flow in an electrical conductor associated therewith, trip circuitry, and circuit interrupter means. In the method, an alternating current source is provided. The alternating current source is connected to the current transformer means of the circuit breaker. The current transformer means is then energized with an alternating current from the alternating current source, the alternating current source having a preselected range of current magnitude. The magnitude of the current in the alternating current signal is monitored. The magnitude of the current in the alternating current signal and the state of the circuit interruption means is compared with a predetermined magnitude of alternating current at which the circuit interruption means in the circuit breaker in proper working condition would be placed in an open state to provide an indication of the condition of the circuit breaker. The circuit interruption means in the circuit breaker has an open state for an overcurrent flow and a closed state for normal current flow.

If more than one current transformer means is present in the transformer, such as if a three phase, alternating current were passing through the circuit breaker, it is desirable to connect the means for generating an alternating current signal with an other current transformer means in the circuit breaker and repeat the above mentioned energizing step, monitoring step and comparing step. It is further desirable to connect the means for generating an alternating current signal with any remaining current transformer means in the circuit breaker and repeating the above mentioned energizing step, monitoring step and comparing step. In this manner, the method of the invention can provide for testing of the circuit breaker through each current sensing means therein.

In circuit breakers tested according to the method of the present invention, current transformer or transformers typically have a secondary winding of two coils connected in series. If this is the case, in the method of the present invention, the means for generating an alternating current signal is connected with the secondary winding of a current transformer across a coil thereof. The energizing, monitoring, and comparing steps as hereinbefore mentioned are then carried out to test the circuit breaker. Since the secondary winding of the current transformer has more than one coil, it is desirable in the method to connect the means for generating an alternating current signal across each coil in the secondary winding of the current transformer and repeat the energizing step, the monitoring step and the comparing step. Further, if other current transformers are present in the circuit breaker, it is desirable to connect the means for generating an alternating current signal to the secondary winding of any other current transformer in the circuit breaker across each coil thereof and then repeating the energizing, monitoring and comparing steps, as hereinbefore mentioned. It is desirable that each current transformer in the circuit breaker be tested in this manner to provide an indication of the condition of the circuit breaker through each current transformer.

The present invention also provides an apparatus for use in testing a circuit breaker adapted for connection with a low voltage alternating current source and with a current transformer means included in the circuit breaker associated with an electrical phase conductor for monitoring current flow therethrough. The apparatus includes a means for varying the magnitude of the current supplied by the alternating current source. The apparatus also has a capacitive means having a capacitive reactance $X_C$ and an inductive means having an inductive reactance $X_L$. The inductive means is connected in series with the capacitive means and both are connected in circuit relationship with the means for varying the magnitude of the voltage of the low voltage alternating current source. The capacitive reactance $X_C$ of the capacitive means is of a significantly greater magnitude than the inductive reactance $X_L$ of the inductive means.

Accordingly, an object of the present invention is to provide a method for testing and an apparatus for use in testing a circuit breaker which requires a relatively low power alternating current source, to test the entire circuit breaker.

Another object of the present invention is to provide a method for testing and an apparatus for use in testing a circuit breaker which eliminates the need to connect and disconnect conductors which normally conduct current into and out of the circuit breaker, as well as substantially eliminate the need for movement of the circuit breaker to conduct a test thereof.

An additional object of the present invention is to provide a method for testing and an apparatus for use in testing a circuit breaker which can minimize safety hazards associated with testing of the circuit breaker by eliminating the need to connect or disconnect the electrical conductors from the circuit breaker.

A further object of the present invention is to provide an apparatus of a relatively small volume and weight for use in testing a circuit breaker.

These and other objects of the present invention will be more completely disclosed and described in the following specification, the accompanying drawings and the appended claims.

DESCRIPTION OF THE PREFERRED EMBODIMENTS

Figure 1:
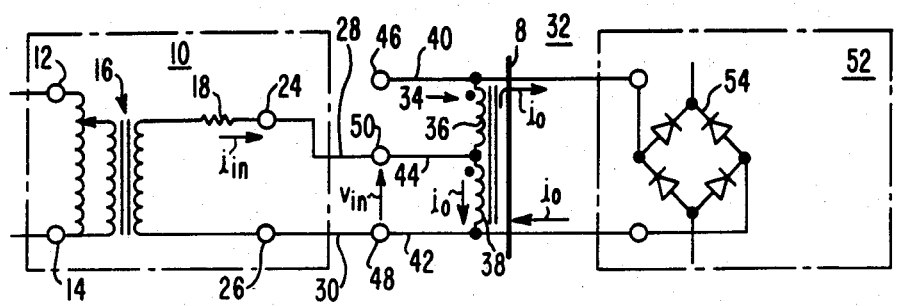
FIG. 1 shows a schematic circuit diagram of an embodiment of an apparatus of the present invention connected with a secondary winding of a current transformer in a pole of a circuit breaker.
Figure 2:
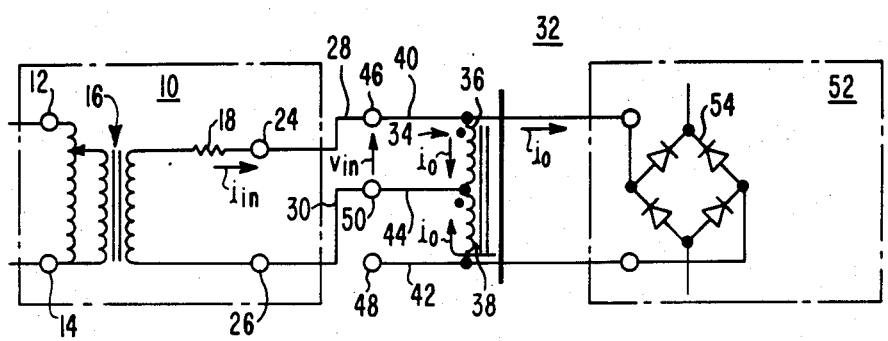
FIG. 2 shows a schematic circuit diagram of an embodiment of an apparatus of the present invention connected with a secondary winding of a current transformer in a pole of a circuit breaker with the polarity connection reversed from that shown in FIG. 1.

Referring to FIGS. 1 and 2, there is shown a schematic circuit diagram for illustrating the method of the present invention. An embodiment of an apparatus of the present invention for use in testing a circuit breaker according to the method of the present invention, generally designated by the numeral 10, is also illustrated in FIGS. 1 and 2.

In testing a circuit breaker according to the method of the invention, a low voltage alternating current source (not shown) is provided across inputs 12 and 14 of apparatus 10. An example of a suitable low voltage alternating current source is a 120 V, 60 Hz source.

Apparatus 10 has a variable voltage device, such as variac 16, for varying the voltage of the alternating current source. Variac 16 is connected to the low voltage, alternating current source through inputs 12 and 14.

Apparatus 10 has impedance circuitry 18 shown in functional block diagram form which is serially connected in circuit relationship with variac 16. Impedance circuitry 18 aids in maintaining a sinusoidal wave shape for the alternating current and aids in providing a safe level for the magnitude of the current if the output of apparatus 10 becomes shorted in testing a defective circuit breaker.

Figure 7:
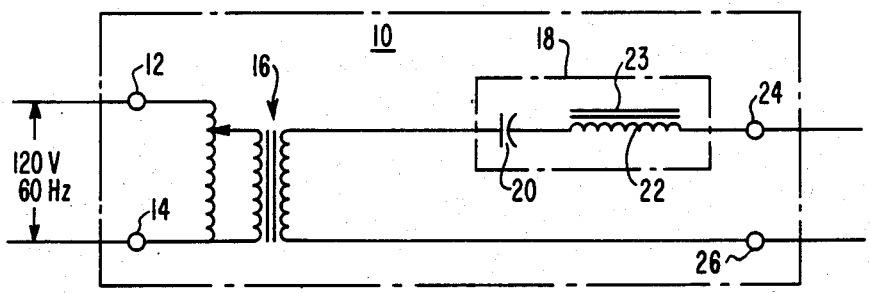
FIG. 7 shows, in schematic circuit diagram form, an embodiment of an apparatus of the present invention for use in testing a circuit breaker.

As shown best in FIG. 7, impedance circuitry 18 desirably consists of a capacitive means, such as capacitor 20 and an inductive means, such as inductor 22 having a choke 23. Capacitor 20 and inductor 22 are serially connected with each other, as shown in FIG. 7. Impedance circuitry 18 and apparatus 10 will be discused in greater detail hereinafter.

Variac 16 and impedance circuitry 18 provide a suitable means for generating an alternating current signal from a low voltage alternating current source. Variac 16 provides the capability to vary the magnitude of the voltage of the alternating current source and thereby vary the magnitude of the current of the alternating current signal which is to be input into a circuit breaker to be tested, as discussed later herein. Variac 16 and impedance circuitry 18 are an example of a suitable means for generating an alternating current signal; other means are possible depending upon use, application and the particular circuit breaker to be tested.

Apparatus 10 has terminals 24 and 26 for interconnecting apparatus 10, including means for generating an alternating current signal, with a current transformer, in a pole of a circuit breaker to be tested. Lead wires 28 and 30 have appropriate connectors to mate with terminals 24 and 26 at one end thereof and suitable connectors at the other end thereof for mating with terminals connected with the current sensing means in the circuit breaker to be tested. Lead wires 28 and 30 thereby provide a detachable means for interconnecting apparatus 10 and the circuit breaker to be tested according to the method of the invention. Terminals 24 and 26 and lead wires 28 and 30 provide an example of a suitable way to interconnect device 10 with the circuit breaker to be tested. Other suitable conventional ways of interconnection are possible, as is known to those skilled in the art.

A portion of a circuit breaker 32 is also illustrated in FIGS. 1 and 2. A current sensing means in the form of a current transformer 34 is shown in circuit breaker 32. Current transformer 34 is assocaited with an electrical phase conductor connected to the circuit breaker for monitoring current flow therethrough. If circuit breaker 32 were connected with a three phase alternating current supply, typically three current transformers 34, or current sensing means, would be provided in the circuit breaker, each associated with a phase conductor of the three phase alternating current connected therewith. For exemplary purposes, FIGS. 1 and 2 show only a single current transformer associated with an electrical phase conductor connected with the circuit breaker.

Current transformer 34 has a secondary winding of two identical secondary coils 36 and 38 serially connected with each other. Typically, these current transformers for use in circuit breakers also have a one turn primary winding and a rectangularly shaped iron core. Current transformer 34, in FIGS. 1 and 2, is an example of suitable current sensing means in a circuit breaker to be tested. Other suitable current sensing means are possible, such as a one coil secondary winding current transformer, for example.

In connecting apparatus 10, including means for generating an alternating current signal, with the current sensing means, or current transformer 34, of circuit breaker 32, suitable connecting wires 40 and 42 are connected to and brought from the secondary output leads of coils 36 and 38 and a connecting wire 44 is brought from the junction of secondary coils 36 and 38 to suitable terminals 46, 48 and 50, respectively, desirably located on the breaker cover and connected with the appropriate connecting wire from the secondary winding of current transformer 34. If a three phase alternating current supply was connected with circuit breaker 32, three current transformers 34 typically would be included in circuit breaker 32 with three terminals 46, 48 and 50 associated with each current transformer 34 in each pole of the circuit breaker for a total of nine terminals or test inputs provided on circuit breaker 32. As previously mentioned, FIGS. 1 and 2 illustrate connection with only a single current transformer in a pole of a circuit breaker having a phase conductor, such as one phase of a three phase conductor, associated therewith. Lead wires 28 and 30 connect apparatus 10, including means for generating an alternating current signal, with coil 38 of the secondary winding of current transformer 34 at terminals 50 and 48 in FIG. 1; and lead wires 28 and 30 connect apparatus 10 with coil 36 of the secondary winding of current transformer 34 at terminals 46 and 60. In a current transformer having a secondary winding of two coils, as current transformer 34 of FIGS. 1 and 2, it is preferable to connect apparatus 10 across one coil thereof, such as coil 38 and carry out the other remaining steps in the method as to be discussed hereinafter and then connect apparatus 10 across coil 36 and then again conduct the other remaining steps in the method of the invention. In other words, it is desirable to conduct the test method twice on each current transformer in circuit breaker 32, once across each coil of each secondary winding thereof. Repeating the method of the present invention so as to perform the method with connection of the means for generating an alternating current signal across each coil in the secondary winding in each current transformer of the circuit breaker, connecting across only one secondary coil at a time per test, can provide a better indication of the condition of the circuit breaker, especially if a defective condition would exist in one of the coils of the secondary winding of the transformer, as to be discussed later herein. Additionally, connecting wires 40, 42 and 44 and terminals 46, 48 and 50 represent one of a suitable number of conventional ways of providing a connection of a current sensing means, such as a current transformer 34, in circuit breaker 32 with apparatus 10, including means for generating an alternating current signal. Other suitable means or connections are possible, as is known to those skilled in the art.

Each current transformer 34, or current sensing means, in circuit breaker 32 has connected therewith in circuit relationship trip circuitry and circuit interruption means, generally designated in block diagram form by the numeral 52. In a typical circuit breaker 32, each current transformer 34 will interconnect in circuit relationship through a rectification means, such as a diode bridge 54, to common trip circuitry, which trip circuitry then connects to a circuit interruption means which functions to open circuit breaker 32 in the event of a current overload. U.S. Pat. Nos. 3,852,660 to Maier et al. and 3,924,160 to Maier et al. disclose a suitable circuit breaker which could be adapted with appropriate input terminals, such as input terminals 46, 48 and 50 and connecting wires, such as connecting wires 40, 42 and 44, for example, for testing of the circuit breaker according to the method of the present invention.

Referring to FIGS. 1 and 2, a current sensing means, such as current transformer 34, in circuit breaker 32 is energized with an alternating current signal from apparatus 10, including means for generating an alternating current signal, the alternating current signal having a preselected range of voltage and current magnitude over which it can be varied in testing a circuit breaker, such as circuit breaker 32. In a typical energization of current transformer 34, an input current $i_{in}$ would flow as indicated in FIGS. 1 and 2 into current transformer 34 and output coil currents $i_o$ would flow as illustrated in FIGS. 1 and 2 depending upon which secondary coil apparatus 10 is connected across. The input voltage $V_{in}$ is also as indicated in FIGS. 1 and 2. The polarity of the connection in FIG. 2 is reversed from that of FIG. 1. Repeating the method of the invention with the polarity reversed, as in FIG. 2, for example, is desirable in detecting certain problem conditions which may be present in a coil of a secondary winding of current transformer 34. The coil output currents $i_o$ illustrated in FIGS. 1 and 2 show a normal current flow if current transformer 34 is in proper working condition.

In determining the preselected range of magnitude for the voltage and current of the alternating current signal which energizes a current transformer, such as current transformer 34 in circuit breaker 32, the current $i_b$ at which a circuit breaker in proper working condition would trip is taken into consideration in setting the preselected range of voltage and current magnitude for the alternating current signal. For example, in the current transformer 34 shown in FIGS. 1 and 2 having a secondary winding of two identical coils serially connected to each other, the current $i_b$ at which circuit breaker 32 would trip through opening of the circuit interruption means is related to $i_{in}$ by the following relation:

$$i_b = \frac{i_{in}}{2} N = i_o N$$

where N is the current transformer ratio. Assuming current transformer 34 is not defective, both output coil currents $i_o$ must be equal to maintain an ampere turn balance and the magnitude of $i_{in}$ would be substantially equal to twice the magnitude of $i_o$ in current transformer 34 of circuit breaker 32. By knowing the value of $i_{in}$ when the circuit breaker tripped causing opening of the circuit interruption means and the current transformer ratio N the breaker calibration can be easily verified. The value of $i_{in}$ can be determined by use of any suitable conventional current measuring means, such as a conventional current meter, appropriately placed in apparatus 10, as is known to those skilled in the art.

In energizing the current sensing means, such as current transformer 34, the magnitude of the voltage and current of the alternating current signal is typically varied from about zero magnitude through the preselected range of current magnitude for a particular circuit breaker. The preselected range for the voltage and current magnitude is determined for each particular breaker considering the value of $i_b$ known to cause opening of the circuit interruption means in the circuit breaker and considering various conditions present in the circuit breaker promoting improper operation of the circuit breaker. By energizing the current sensing means, such as current transformer 34, with an alternating current signal of varying voltage magnitude in a preselected range of magnitude, the magnitude of the input current $i_n$ which energizes the current sensing means, such as current transformer 34, will likewise be varied.

In the method of the present invention, the magnitude of the input current $i_{in}$ in the alternating current signal is monitored, such as with a conventional current meter (not shown), as previously discussed herein. The magnitude of the current $i_{in}$ in the alternating current signal and the state of the circuit interruption means at a particular current magnitude is compared with a predetermined magnitude of alternating current for the circuit breaker $i_{inb}$ at which the circuit interruption means in the circuit breaker in proper working condition would be placed in an open state to disconnect the circuit breaker from the conductors carrying an overcurrent flow to provide an indication of the condition of the circuit breaker tested.

If a circuit breaker has more than one current sensing means, or current transformer, it is most desirable to repeat the method of the present invention for each current sensing means, or current transformer, in the circuit breaker by the connection of apparatus 10, including means for generating an alternating current signal, with each current sensing means one at a time per test, as previously discussed herein. Further, if the current sensing means is a current transformer having more than one coil in the secondary winding, such as current transformer 34 of FIGS. 1 and 2, it is also desirable to connect apparatus 10 across each coil in the secondary winding in a current transformer and repeat the test method of the present invention on a current transformer as many times as there are coils in a secondary winding in a current transformer, with the connection of apparatus 10 being made across one coil in a secondary winding at a time per test. For example, circuit breaker 34 of FIGS. 1 and 2 has two secondary coils 36 and 38; and FIGS. 1 and 2 illustrate the connection of apparatus 10 across each secondary coil thereof for testing circuit breaker 32 through energization of current transformer 34 according to the invention. Testing of the circuit breaker in this manner can provide a relatively complete indication of the condition of the circuit breaker through the energization of each current sensing means, or current transformer, as hereinbefore described.

In conducting the testing method of the present invention, it is important that no load current be flowing through the conductors into and out of the circuit breaker. However, an advantage of testing a circuit breaker by the method of the present invention is that it is not necessary to disconnect and reconnect the load conductors which normally conduct current into and out of the circuit breaker.

As previously mentioned, the method of the present invention includes a test of the current sensing means, such as a current transformer, in the test of the circuit breaker. Referring to FIGS. 3, 4, 5 and 6, there are illustrated schematic circuit diagrams illustrating various defective current transformer conditions in a typical circuit breaker which may be indicated through application of the method of the present invention. In these FIGS. 3-6, for ease of illustration, a variable alternating current voltage source 56 is shown which includes a low voltage alternating current source connected to a means for varying the voltage of the source; and in FIGS. 3-6 the secondary winding of the current transformer 34 is shown with secondary coils 36 and 38 with current transformer 34 being energized with an alternating current signal across coil 38 thereof.

Figure 3:
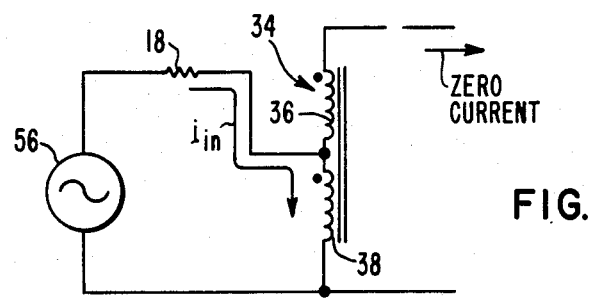
FIGS. 3, 4, 5 and 6 are schematic circuit diagrams illustrating various defective current transformer conditions in a circuit breaker.

In FIG. 3, coil 36 is open as indicated by the letter "X". If the remainder of the circuit were connected as shown in FIG. 1, zero current would flow through coil 36 and substantially all of the input current $i_{in}$ would flow through coil 38. Since coil 36 is open, no current would flow into the trip circuit and no trip would occur. Therefore, comparing the magnitude of the current $i_{in}$ in the alternating current signal and the state of the circuit interruption means at a given current magnitude with the predetermined magnitude $i_{inb}$ would provide an indication that this condition is possibly present in the circuit breaker. The current flow is shown in FIG. 3. Additionally, coil 38 would present a relatively high impedance to the testing apparatus.

Figure 4:
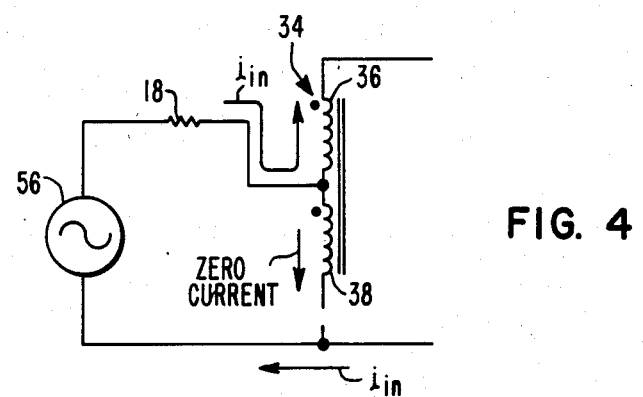

In FIG. 4, a condition is indicated where coil 38 is open as indicated by the "X". With current transformer 34 being connected in the circuit breaker as shown in FIG. 1, substantially all of the input current $i_{in}$ would flow through coil 36 to the trip circuitry and zero current will flow through coil 38. Additionally, coil 36 would present a relatively high impedance to the testing apparatus providing the alternating current signal. The current flow is as indicated in FIG. 4. Therefore, comparing the value of the current $i_{in}$ when the circuit interruption means would open with the predetermined magnitude of alternating current $i_{inb}$ for the circuit breaker may provide an indication of the presence of this condition in the circuit breaker.

Figure 5:
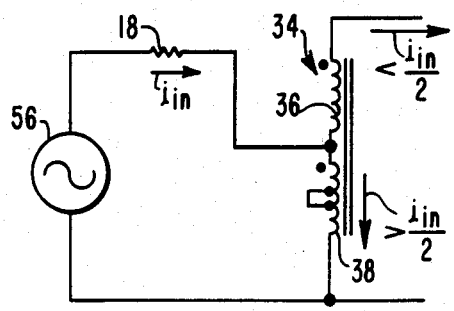

In FIG. 5, coil 38 is shown as having partially shorted turns. As a result of the short, more of the input current $i_{in}$ will tend to flow through coil 38, the magnitude of that current being greater than $i_{in}/2$, and the magnitude of the current flowing through coil 36 will be less than $i_{in}/2$. Therefore, more input current $i_{in}$ than the current $i_{inb}$, the normal current level at which the circuit interruption means would open, would be required for the circuit breaker to trip. Comparing the magnitude of the input current $i_{in}$ with the predetermined magnitude of alternating current $i_{inb}$ at which the circuit interruption means in the circuit breaker would normally be placed in an open state, may provide an indication of this condition being present in the circuit breaker. The flow of the current through the coils is illustrated in FIG. 5.

Figure 6:
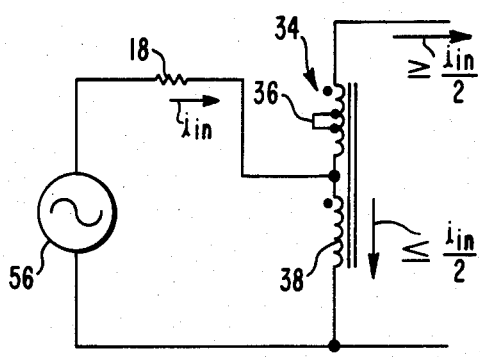

In FIG. 6, coil 36 is illustrated as having shorted turns. In this condition, the current flowing through coil 36 would be greater than or equal to $i_{in}/2$ and the current flowing through coil 38 would be less than or equal to $i_{in}/2$. However, because the current flowing through coil 36 could be equal to $i_{in}/2$, this condition may be difficult to detect by just conducting the test method once having the alternating current signal being applied across coil 38 of the secondary winding of current transformer 34. Therefore, it is desirable to reverse the inputs and have the secondary winding of current transformer 34 also energized across coil 36 (not shown in FIG. 6) similar to the arrangement shown in FIG. 2. By energizing the secondary winding of current transformer 34 across coil 36, a condition would be present similar to that previously discussed with regard to FIG. 5 in that a current less than $i_{in}/2$ would flow through coil 36 and a current greater than $i_{in}/2$ would flow through coil 38. The condition of FIG. 6 illustrates the desirability of repeating the method of the present invention on a current transformer having more than one coil in the secondary winding with the connection in each test being made across a different coil in the secondary winding to provide an indication of this condition being present in the circuit breaker.

If the current transformers 34 of FIGS. 3-6 were in good working order, the trip current would be the same when the alternating current signal is applied across one secondary coil in one test and across the other secondary coil in another test. The current transformers 34 of FIGS. 5 and 6 with shorted turns in one of the secondary coils would cause the circuit breaker to trip at too high a current on one test where the alternating current signal is applied across one secondary coil of the current transformer and the circuit breaker would trip at a normal or less than normal current on the other test when the alternating current signal is applied across the other secondary coil of the current transformer. Additionally, in the examples of FIGS. 3-6, a current transformer ratio of N=1 is used for purposes of illustration. Normally N is much greater than 1.

Referring to FIG. 7, an apparatus 10 for use in testing a circuit breaker according to the method of the present invention is illustrated therein in greater detail than in FIGS. 1 and 2. The apparatus 10 of the present invention is adapted for connection with a low voltage alternating current source, such as a 120 V, 60 Hz source as shown in this Figure, and with a current sensing means, such as current transformer 34, included in the circuit breaker associated with an electrical phase conductor for monitoring current flow therethrough. As previously discussed, the apparatus 10 includes a variable voltage device, such as variac 16, for varying the magnitude of the voltage of the low voltage alternating current source. Variac 16 is adapted to be suitably connected with the low voltage alternating current source through inputs 12 and 14, as shown in FIG. 7. Apparatus 10 also has impedance circuitry 18 which includes a capacitive means, such as capacitor 20 having a reactance $X_C$ and an inductive means, such as inductor 22 having a reactance $X_L$. FIG. 7 illustrates capacitor 20 and inductor 22 serially connected with each other and being connected serially in circuit relationship with variac 16. Inputs 24 and 26 are also desirably provided on apparatus 10 for connection of leads thereto for providing the energizing alternating current to the current sensing means to conduct a test of the circuit breaker.

Apparatus 10 is desirably designed so as to be able to test a range of circuit breakers which have a wide variation of rated currents. Additionally, various concerns are present which must be considered in providing an apparatus for use in testing a circuit breaker according to the method of the present invention. For example, if the current sensing means is a current transformer similar to current transformer 34 of FIGS. 1 and 2, the impedance when looking into the test input, such as terminals 46 and 50, or terminals 48 and 50, would have a lagging power factor due to the leakage reactance in the current transformer. Also, the higher the breaker current rating, the higher the impedance that will be seen when looking into the test inputs of the current transformer. Further, on the highest rated current breaker, a relatively high voltage must be developed to provide the necessary magnitude for the input current $i_{in}$ in the alternating current signal for the circuit breaker to trip. The apparatus of the present invention must further be able to provide and maintain a sinusoidal current for proper breaker calibration and testing of the circuit breaker. Further, the apparatus of the present invention must be designed to take into consideration the possibility of having its output shorted without damage to the apparatus itself.

In view of these considerations, the value of the reactances $X_C$ for the capacitive means and $X_L$ for the inductive means are chosen so that $X_C$ is of a significantly greater magnitude than $X_L$, such as at a 120 V, 60 Hz alternating current supply. The apparatus for testing a circuit breaker than only has to provide an alternating current signal of sufficient voltage to overcome the voltage drop seen when looking into the test input terminals of the current transformer, such as terminals 46 and 50, or terminals 48 and 50 of FIGS. 1 and 2. If the alternating current signal output should become shorted, such as from a defective circuit breaker being tested, the magnitude of the current would be limited by the value of $X_C-X_L$; and, by proper choice of the component values for the capacitive means and the inductive means, the magnitude of the current $i_{in}$, the output current of the alternating current signal, is maintained at a safe level.

Further, at third harmonic and higher frequencies, $X_L$ and $X_C$ are desirably chosen to present a relatively high impedance to these higher harmonic frequencies to maintain a substantially sinusoidal wave shape of the current in the alternating current signal for proper calibration and testing of the circuit breaker. For example, if the base or first harmonic frequency is at 60 Hz, at higher harmonic the capacitive reactance $$X_C' = \frac{X_{C60}}{n}$$

and the inductive reactance $X_L'=nX_{L60}$ where n is the order of the harmonic and $X_{C60}$ and $X_{L60}$ are the capacitive and inductive reactances, respectively, at a 60 Hz base frequency in this example.

In circuit breakers having solid state trip circuitry, the nonlinear resistance characteristic of the solid state trip circuitry may tend to distort the substantially sinusoidal current wave form of the alternating current signal. On high rated current circuit breakers having current transformers, for example, this is not generally a problem, since the current transformer impedance is typically significantly greater than the circuit resistance of the trip circuitry and distortion of the current wave form is substantially minimized. On low rated current circuit breakers, the circuit resistance of the trip circuitry dominates over the transformer impedance. However, in this case, if the value of $X_C-X_L$ is appropriately chosen to swamp out the circuit resistance of the trip circuitry, the sinusoidal wave shape of the current will be substantially maintained.

It can be seen that the invention as described herein includes a circuit interrupter which has electrical contact apparatus which is interconnected with an electrical conductor for separating upon command to interrupt electrical current which flows in the electrical conductor. Control apparatus is interconnected with the contact apparatus for supplying the command to the contact apparatus at an appropriate time. A current transformer is interconnected with the control apparatus and disposed to monitor the electrical current in the electrical conductor to thus cause the control apparatus to supply the command when that electrical current exceeds a predetermined value, which may, for example, be some value which is related to the overload current of the current interrupter. A current transformer is provided which has two serially connected coil portions as described previously with a first terminal 50 which is electrically interconnected with the region between the two coil portions 36 and 38 and second and third terminals 46 and 48, respectively, which are interconnected with the other end respectively of each of the coil portions 36 and 38. The terminals are useful for testing the current transformer means which includes the combination of the coils 36 and 38, the electrical control circuit apparatus 52 which includes the bridge 54 and separable contact means which are also included as part of apparatus 52. The operation is to cause the contact means to separate upon command at an appropriate time when the electrical current in an electrical conductor such as 8 exceeds the predetermined value. This can be done without having to energize the electrical conductor 8. The coils 36 and 38 may be of equal value, that is, their inductance, resistance, capacitance, etc. may be approximately the same. This means that the terminal 50 is disposed at the midpoint approximately of the current transformer apparatus. It can be seen that an appropriate method thus may be utilized for testing the circuit interrupter. This is done by interconnecting a device such as 10 between the coils 50 and 48 to begin with and then changing the current $i_{in}$ over a period of time. This current is monitored and the value thereof at which the circuit interrupter trips is recorded. The apparatus 10 is then connected between the terminals 50 and 46 and the process repeated. If the value of the two currents is generally within a predetermined range, then the tripping value of the circuit interrupter is roughly equal to that current. Generally, the test is conducted by increasing the current $i_n$.

In summary, the present invention provides a method for and an apparatus for use in testing a circuit breaker which promotes increased safety, minimization of down time required for testing the breaker, and a lower cost for testing the circuit breaker. Additionally, the present invention offers a method for testing and an apparatus for use in testing the entire circuit breaker. Further, the method for and the apparatus for use in the testing of a circuit breaker offered by the present invention is particularly advantageous in testing circuit breakers that are installed and providing the requisite circuit protection in a particular application.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. A method for testing a circuit interrupter which has a current transformer which monitors current in an electrical conductor to be served by the circuit interrupter where the current transformer has two relatively equal coil portions serially connected to form a coil transformer midpoint where a first terminal is connected to the midpoint and second and third terminals are connected, respectively, to the other ends of each of said coil portions, comprising the steps of:
   (A) interconnecting a source of controlled electrical current between said first and said second terminals;
   (B) changing the current of step (A) over a period of time;
   (C) monitoring the changing current of step (B);
   (D) noting at which value of current of step (C) the circuit interrupter trips;
   (E) interconnecting a source of controlled electrical current between said first and said third terminals;

(F) changing the current of step (E) over a period of time;

(G) monitoring the changing current of step (F); and (H) noting at which value of current of step (G) the circuit interrupter trips, if the value of the current in step (H) is generally within a predetermined range equal to the value of the current in step (D), then the tripping value of the circuit interrupter is generally equal to that value.

2. The method of claim 1 wherein the current of step (B) is increased.

3. A method for testing a circuit interrupter which has a current transformer which monitors current in an electrical conductor to be served by the circuit interrupter where the current transformer has two relatively equal coil portions serially connected to form a coil transformer midpoint where a first terminal is connected to the midpoint and second and third terminals are connected, respectively, to the other ends of each of said coil portions, comprising the steps of:

(A) interconnecting a source of controlled electrical current between said first and said second terminals;

(B) changing the current of step (A) over a period of time;

(C) monitoring the changing current of step (B);

(D) noting at which value of current of step (C) the circuit interrupter trips;

(E) interconnecting a source of controlled electrical current between said first and said third terminals;

(F) changing the current of step (E) over a period of time;

(G) monitoring the changing current of step (F); and (H) noting at which value of current of step (G) the circuit interrupter trips, if the value of the current in step (H) is equal to the value of the current in step (D), then the following is known about the current transformer: neither of the two relatively equal coil portions are opened nor are the windings of one coil portion shorted without the winding of the other coil portion being shorted generally equally.

4. The method of claim 3 wherein the current of step (B) is increased.

5. A method for testing a circuit interrupter which has a current transformer which monitors current in an electrical conductor to be served by the circuit interrupter where the current transformer is supposed to have two relatively equal coil portions serially connected at a midpoint to form a coil transformer midpoint, where a first terminal is connected to the midpoint and second and third terminals are connected, respectively, to the other ends of each of said coil portions, but wherein in fact one coil portion has at least two turns shorted together, comprising the steps of:

(A) interconnecting a source of controlled electrical current between said first and said second terminals;

(B) increasing the current of step (A);

(C) monitoring the changing current of step (B);

(D) noting at which value of current step (C) the circuit interrupter trips;

(E) interconnecting a source of controlled electrical current between said first and said third terminals;

(F) increasing the current of step (E);

(G) monitoring the changing current of step (F); and (H) noting at which value of current of step (G) the circuit interrupter trips, if the two currents are different, those two terminals which interconnect with the coil portion which has the shorted turns will conduct the higher value of current.

* * * * *